US012660806B2

(12) United States Patent
Anderson

(10) Patent No.: US 12,660,806 B2
(45) Date of Patent: Jun. 23, 2026

(54) INTELLIGENT WEED TREATMENT

(71) Applicant: Deere & Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 516 days.

(21) Appl. No.: 18/087,550

(22) Filed: Dec. 22, 2022

(65) Prior Publication Data

US 2024/0206451 A1     Jun. 27, 2024

(51) Int. Cl.
| | |
|---|---|
| *G06T 7/00* | (2017.01) |
| *A01M 7/00* | (2006.01) |
| *A01M 21/04* | (2006.01) |
| *G06V 20/10* | (2022.01) |

(52) U.S. Cl.
CPC ........ *A01M 7/0089* (2013.01); *A01M 21/046* (2013.01); *G06T 7/0012* (2013.01); *G06V 20/188* (2022.01); *G06T 2207/20021* (2013.01); *G06T 2207/20081* (2013.01); *G06T 2207/30188* (2013.01)

(58) Field of Classification Search
CPC .......................... A01M 7/0089; A01M 21/046; G06V 20/188; G06T 7/0012; G06T 2207/20021; G06T 2207/20081; G06T 2207/30188
See application file for complete search history.

(56) References Cited

U.S. PATENT DOCUMENTS

| | | | |
|---|---|---|---|
| 8,321,365 | B2 | 11/2012 | Anderson |
| 9,538,714 | B2 | 1/2017 | Anderson |

| | | | | |
|---|---|---|---|---|
| 11,032,967 | B2 | 6/2021 | Connell et al. | |
| 2018/0192577 | A1* | 7/2018 | Smith | A01C 1/06 |
| 2019/0050948 | A1* | 2/2019 | Perry | G06Q 30/02 |
| 2019/0362146 | A1* | 11/2019 | Polzounov | G06N 3/08 |
| 2022/0232763 | A1 | 7/2022 | Palla et al. | |
| 2022/0240433 | A1* | 8/2022 | Hoffmann | A01B 79/02 |
| 2023/0078852 | A1* | 3/2023 | Campbell | G06F 16/29 |
| | | | | 705/7.11 |

OTHER PUBLICATIONS

Carbon Robotics, "Autonomous Laserweeder Demo Unit," Date Unknown, 5 pages, [Online] [Retrieved on Dec. 21, 2022] Retrieved from the Internet <URL: https://carbonrobotics.com/autonomous-weeder>.
Cech, R. et al., "Pesticide Use and Associated Greenhouse Gas Emissions in Sugar Beet, Apples, and Viticulture in Austria from 2000 to 2019," Agriculture 12(6), Jun. 17, 2022, pp. 1-16.

(Continued)

*Primary Examiner* — Ross Varndell
*Assistant Examiner* — Nhut Huy Pham
(74) *Attorney, Agent, or Firm* — Fenwick & West LLP

(57) ABSTRACT

An image of a portion of a geographic area is accessed by a farming machine. The image is analyzed by the farming machine to identify a plant in the portion of the geographic area. A treatment plan is determined for the plant by the farming machine based on one or more characteristics of the plant and further based on a set of treatment objectives. The set of treatment objectives including two or more of a plant hindrance objective, a plant reproduction limiting objective, a carbon footprint limiting objective, and a collateral damage limiting objective. An action is performed by the farming machine based on the treatment plan.

16 Claims, 7 Drawing Sheets

(56)  References Cited

OTHER PUBLICATIONS

Deere & Company, "See & Spray™ Ultimate," Date Unknown, 11 pages, , [Online] [Retrieved on Dec. 21, 2022] Retrieved from the Internet <URL: https://www.deere.com/en/sprayers/see-spray-ultimate/>.

Michigan State University, "Dandelion," Date Unknown, 3 pages, [Online] [Retrieved on Dec. 21, 2022] Retrieved from the Internet <URL: https://www.canr.msu.edu/weeds/extension/dandelion>.

Rhoades, H., "Dandelion Removal: How to Kill Dandelions," Dec. 8, 2022, 3 pages, [Online] [Retrieved on Dec. 21, 2022] <URL: https://www.gardeningknowhow.com/edible/herbs/dandelion/dandelion-control.htm>.

The Backyard Herbalist School, "Dandelion—A Prolific Weed with Invaluable Plant Medicine & Nutrition," Date Unknown, 14 pages, [Online] [Retrieved on Dec. 21, 2022] Retrieved from the Internet <URL: https://thebackyardherbalistschool.com/dandelion-a-prolific-weed-with-invaluable-plant-medicine/>.

* cited by examiner

Farming Machine
100

Farming Machine
100

System Environment 200

Control System 230

Network 250

Camera Array 210

Camera 212

Processing Unit 214

Component Array 220

Component 222

Input Controllers 224

Sensors 226

300

305

| Treatment Action 310 | Mortality 320A | Reproduction 320B | CO2 320C | Biosystem 320D |
|---|---|---|---|---|
| Rotary hoe | High | Low | High | Med |
| Glyphosate | Med | Low | Low | Med |
| 2,4-D | High | Low | Low | High |
| Laser | Low | Med | Low | Low |
| Hot oil | Low | High | Low | Low |

310A
310B
310C
310D
310E

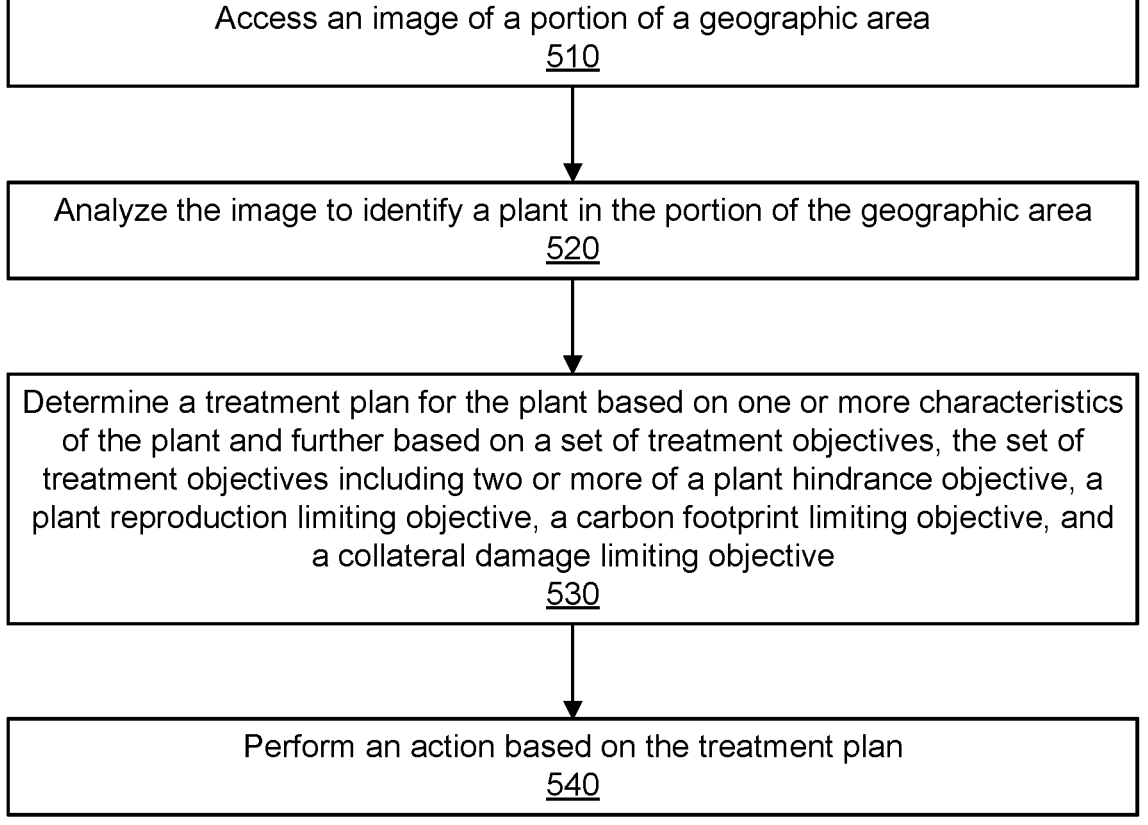

500

Access an image of a portion of a geographic area
510

Analyze the image to identify a plant in the portion of the geographic area
520

Determine a treatment plan for the plant based on one or more characteristics of the plant and further based on a set of treatment objectives, the set of treatment objectives including two or more of a plant hindrance objective, a plant reproduction limiting objective, a carbon footprint limiting objective, and a collateral damage limiting objective
530

Perform an action based on the treatment plan
540

INTELLIGENT WEED TREATMENT

TECHNICAL FIELD

This disclosure relates to identifying and treating plants and, more specifically, to selecting treatments for plants based on identified plant characteristics and treatment objectives.

BACKGROUND

A farming machine (or fleet of farming machines) can include any number of treatment mechanisms (e.g., mechanical treatments, chemical treatments, laser, pneumatic, etc.) to treat plants (e.g., weeds) as the farming machine(s) moves through a field. It is preferable to utilize certain treatment mechanisms that are well suited for treating certain types and/or characteristics of plants. Agricultural managers with long standing experience and expertise may leverage their knowledge to implement appropriate treatment mechanisms based on what is encountered in the field during treatment. However, it is difficult to execute such a customized treatment autonomously or on an industrial scale.

SUMMARY

This disclosure pertains to systems and methods for autonomously treating weeds relative to treatment objectives and treatment constraints. Techniques disclosed herein look to select from among different treatment mechanisms (e.g., chemicals, mechanical treatments, laser, pneumatic, etc.) for treating weeds based on weed characteristics like type of weed and the growth stage of the weed. The systems and methods further account for what the objectives for the treatment are and select different treatment mechanisms based on the treatment objective. For example, if the objective is to kill the weed and stop it from reproducing, the systems and methods may identify a first type of treatment mechanism (e.g., a particular type and quantity of chemical) as the appropriate treatment action. However, if the objective is, e.g., to minimize greenhouse gas emissions (while also killing the weed), the systems and methods may identify a second type of treatment mechanism (e.g., a particular mechanical action) as the appropriate action for treating the weed. Other objectives that may dictate treatment mechanism selection may include limiting collateral damage to adjacent crop plants, maintaining predetermined parameters like organic certification parameters, limiting weed reproductive ability, and the like.

During operation, the systems and methods may capture image data of a portion of a field and detect weeds or weed parts (e.g., root, stem, leaves, flowers, seeds, etc.) using image segmentation algorithms or other computer vision (e.g., machine learning) techniques. Based on the set treatment objectives that have been specified for treatment, and based on data regarding preferred treatment mechanisms (actions) and treatment parameters for weed types and objectives, the system may automatically determine a treatment plan based on characteristics of the detected weeds or weed parts. The treatment plan may include treatment actions (and treatment parameters) for performing weed treatment for the detected weeds.

The systems and methods may autonomously or manually navigate and automatically actuate farming machine components to perform treatment actions per the determined treatment plan to treat the weeds with minimal or no human input or supervision required. The systems and methods may further set and operate under constraints that define the type (or parameters) of treatment actions that can be applied to the weeds in different regions of the field. For example, for a portion of the field that is set as being close to a waterway or a residential area, the constraints may limit what chemical treatments (or related parameters like chemical quantity) may be utilized to treat the weeds in the field portion. In some embodiments, based on the treatment plan, the system may generate a georeferenced weed record that may be stored as treatment plan data and/or transmitted to an external device. The treatment plan data may subsequently be accessed by one or more specialized farming machines to autonomously perform various treatment actions on weeds or weed portions in the field by actuating different treatment mechanisms mounted on the farming machines.

In one embodiment, a method includes a plurality of steps performed by an autonomous farming machine. The steps include a step of accessing an image of a portion of a geographic area, and a step of analyzing the image to identify a plant in the portion of the geographic area. The steps further include a step of determining a treatment plan for the plant based on one or more characteristics of the plant and further based on a set of treatment objectives. The set of treatment objectives include two or more of a plant hindrance objective, a plant reproduction limiting objective, a carbon footprint limiting objective, and a collateral damage limiting objective. The steps further include a step of performing an action based on the treatment plan.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5 is a flow chart illustrating a process of determining the treatment plan for the plant based on characteristics of the plant and based on treatment objectives, in accordance with some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Farming Machine Configuration Example

Figure 1A:
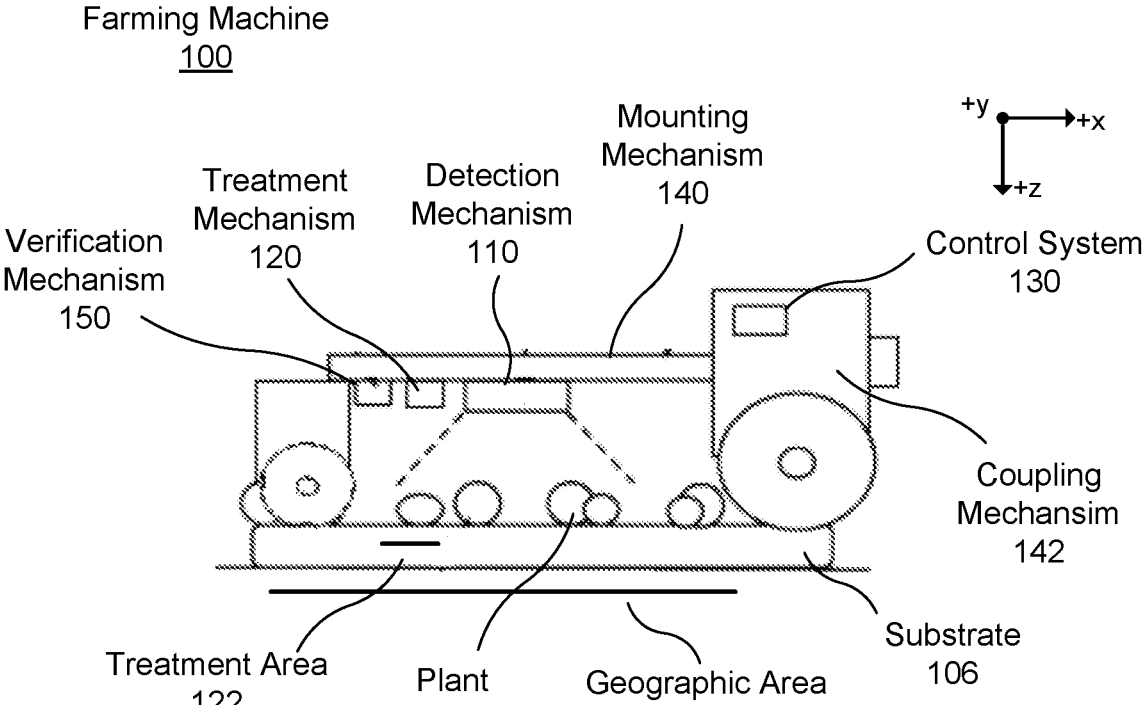
FIG. 1A illustrates a side view of a farming machine, in accordance with some embodiments.
Figure 1B:
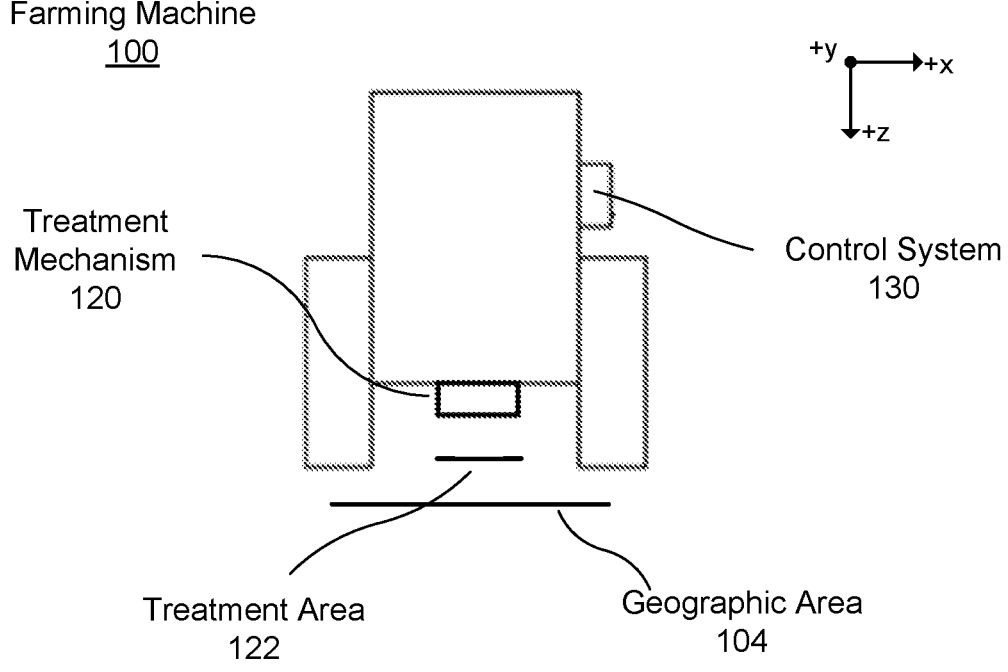
FIG. 1B illustrates a front view of the farming machine, in accordance with some embodiments.
Figure 1C:
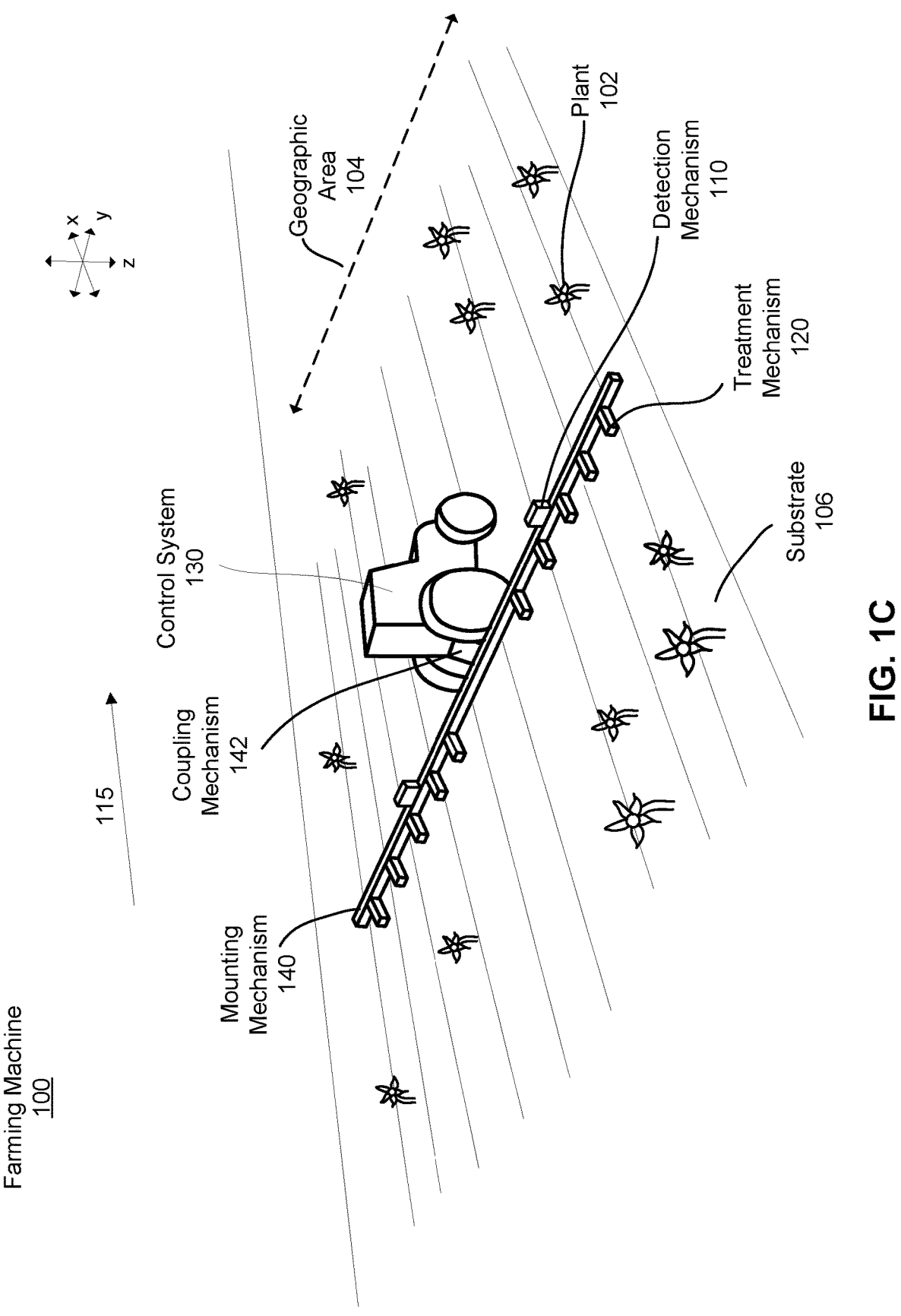
FIG. 1C illustrates an isometric view of the farming machine, in accordance with some embodiments.

A farming machine that identifies and treats plants may have a variety of configurations. FIGS. 1A-1C illustrate exemplary configurations of a farming machine 100 in accordance with some embodiments. The farming machine 100 may include a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below. Some of the functionality of the farming machine 100 as described herein may be subsumed by other entities. For example, at least some of the functionality of the control system 130 as described herein may be subsumed by a central server connected to the farming machine 100 over a network.

The farming machine 100 functions to apply treatment (e.g., weed treatment) to one or more plants 102 (e.g., weed plants, weeds), the ground, or the substrate 106 within a geographic area 104. Often, treatments function to regulate plant growth. The treatment is directly applied to a single plant 102, but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants.

The plants 102 can be crops but could also be weeds or any other suitable plant. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, dandelions, or any other suitable detrimental weed. Generally, plants 102 may include a stem that is arranged superior to (e.g., above) the substrate 106 and a root system joined to the stem that is located inferior to the plane of the substrate 106 (e.g., below ground). The stem may support any branches, leaves, flowers, seedings, and/or fruits. The plant 102 can have a single stem, leaf, flower, seeding, or fruit, or any number of stems, leaves, flowers, seedings, or fruits. The root system may be a tap root system or fibrous root system, and the root system may support the plant 102 position and absorb nutrients and water from the substrate 106. As used herein, "plant" may refer to a whole plant or to one or more components, portions, or parts (e.g., roots, stems, leaves, flowers, fruits, seedings, etc.) of the plant.

Treatments (e.g., treatment actions) that can be applied to plants may depend on whether the plan is a crop plant or a weed. For weeds, the treatments may include necrosing the plant (e.g. killing), pruning, regulating plant growth, regulating plant reproduction, and the like. Necrosing the plant can include dislodging the plant from the supporting substrate 106, incinerating the plant, cutting the plant, or treating the plant in any other suitable manner. Regulating plant growth can include hindering (e.g., retarding) or otherwise controlling plant growth. Examples of regulating plant growth includes applying a treatment concentration of working fluid (e.g., herbicide) to the plant, electrically stimulating the plant, pruning the plant, or otherwise treating the plant. Regulating plant reproduction can include hindering or otherwise controlling reproductive capacity of the plant (e.g., controlling or retarding spread of seeds of the plant).

The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed or be grown in any other suitable configuration. The crop rows are generally spaced between 2 inches and 45 inches apart (e.g., as determined from the longitudinal row axis), but can alternatively be spaced any suitable distance apart, or have variable spacing between multiple rows.

The detection mechanism 110 is configured to identify and locate a plant (e.g., weed) for treatment. As such, the detection mechanism 110 can include one or more sensors for identifying a plant. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, location sensor (e.g., GPS receiver, Bluetooth sensor), or any other suitable sensor. In one embodiment, and as described in greater detail below, the detection mechanism 110 includes an array of image sensors configured to capture an image of a portion of a geographic area. In some example systems, the detection mechanism 110 is mounted to the mounting mechanism 140, such that the detection mechanism 110 traverses over a geographic location before the treatment mechanism 120 as the farming machine 100 traverses through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal to the treatment mechanism 120 relative to the direction of travel 115. In other systems, the detection mechanism 110 can be incorporated into any other component of the farming machine 100.

The treatment mechanism 120 functions to apply a treatment (e.g., action, treatment action) to an identified plant 102 (e.g., weed, portion of weed). The treatment mechanism 120 applies the treatment to a treatment area 122 as the farming machine 100 moves in a direction of travel 115. The effect of the treatment can include plant necrosis or removal, plant growth regulation, plant reproduction regulation, or any other suitable treatment effect as described above. The treatment may include dislodging the plant 102 from the substrate 106, severing the plant 102 (e.g., cutting), incinerating the plant 102, electrical stimulation of the plant 102, chemical or biological application to the plant, light or other radiation application to the plant 102, injecting one or more working fluids into the substrate 106 adjacent the plant (e.g., within a threshold distance from the plant), or otherwise treating the plant.

More specifically, the treatment can include different treatment actions for weed control. The treatment actions for weed control may employ a variety of mechanisms including without limitation chemical (e.g., herbicides, fungicides, insecticides, other pesticides), mechanical (e.g., mechanical interaction with roots, stems, or other portions or components of the plant, ploughing to cut the roots, pulling the weeds from the stem, cutting the weeds using a rotary hoe, etc.), laser, hot liquids (e.g., hot oil spray), pneumatic (e.g., high pressure air or other fluid spray), high pressure liquids, vacuum or suction mechanism (e.g., remove via suction plant or plant portion, remove via suction seeds from plant portion, etc.), and the like.

The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. Treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, such as in FIGS. 1A-1B, the farming machine 100 includes a single treatment mechanism, wherein the treatment mechanism 120 is actuated or the farming machine 100 moved to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of plant in response to identification of the plant and the plant position relative to the assembly. In a third variation shown, such as in FIG. 1C, the farming machine 100 includes an array of treatment mechanisms 120, wherein the treatment mechanisms 120 are actuated or the farming machine 100 is moved to align the treatment mechanism 120 active areas 122 with the targeted plant 102 or plant segment. In some embodiments, the treatment mechanism 120 may include multiple components or assemblies to perform some or all of the treatment actions described above with respect to, e.g., the treatment area 122. In other embodiments, different farming machines 100 of a farming fleet may be employed such that, with respect to, e.g., the treatment area 122, one or more the treatment actions described above may be performable by one farming machine 100, and one or more other treatment actions described above may be performable one or more other farming machines 100.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 may also control operating parameters of the detection mechanism 110. Operating parameters of the detection mechanism 110 may include processing time, location and/or angle of the detection mechanism 110, image capture intervals, image capture settings, etc. The control system 130 may be a computer, as described in greater detail below in relation to FIG. 6. Operation and functionality of the control system 130 is described in greater detail below in relation to FIGS. 2A-2B. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 includes a mounting mechanism 140 that functions to provide a mounting point for the system components. In one example, as shown in FIG. 1A-1B, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame but can alternatively be any other suitable mounting mechanism. In the embodiment of FIG. 1C, the mounting mechanism 140 extends outward from a body of the farming machine 100 in the positive and negative y-direction (in the illustrated orientation of FIGS. 1A-1C) such that the mounting mechanism 140 is approximately perpendicular to the direction of travel 115. The mounting mechanism 140 in FIG. 1C includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 may also include a coupling mechanism 142, such as a hitch, that functions to removably or statically couple to a drive mechanism, such as a tractor. In other examples, the system may have any other means of driving through the field.

In some configurations, the farming machine 100 additionally includes a verification mechanism 150 that functions to record a measurement of the ambient environment (e.g. soil properties, temperatures at one or more heights above the ground surface, wind speed, wind direction, or other) of the farming machine 100. The farming machine may use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or can be different from the detection mechanism 110. In some embodiments, the verification mechanism 150 is arranged distal to the detection mechanism 110 relative the direction of travel, with the treatment mechanism 120 arranged therebetween, such that the verification mechanism 150 traverses over the geographic location after the treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, the control system 130, and the treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Example System Environment

Figures 2A, 3:
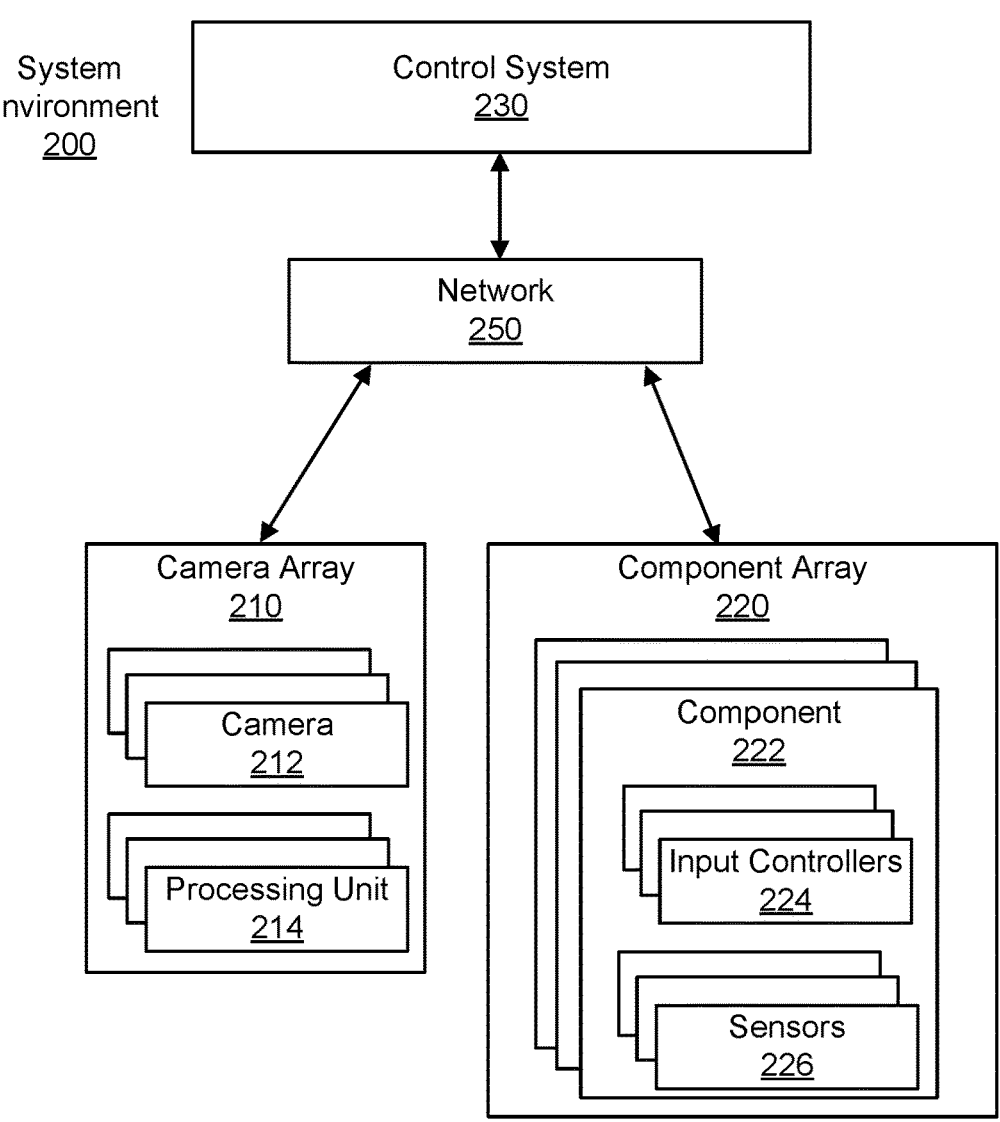
FIG. 2A is a block diagram of a system environment for the farming machine, in accordance with some embodiments.
FIG. 3 illustrates exemplary treatment score data for combinations of treatment actions and treatment objectives, in accordance with some embodiments.

FIG. 2A is a block diagram of a system environment 200 for the farming machine 100 of FIGS. 1A-1C, in accordance with some embodiments. In this example system environment 200 of FIG. 2A, a control system 230 is connected to a camera array 210 and component array 220 via a network 250. The camera array 210 includes one or more cameras 212. The cameras 212 may be a detection mechanism 110 as described in FIG. 1. Each camera 212 in the camera array 210 may be controlled by a corresponding processing unit 214 (e.g., a graphics processing unit). In some examples, more than one camera 212 may be controlled by a single processing unit 214. The array 210 captures image data of the scene around the farming machine 100. For example, the array 210 captures an image of a portion of the geographic area 104 (e.g., shown by dotted lines corresponding to detection mechanism 110 in FIG. 1A). The captured image data may be sent to the control system 230 via the network 250 or may be stored or processed by other components of the farming machine.

The component array 220 includes one or more components 222. Components 222 are elements of the farming machine that can take farming actions (e.g., a treatment mechanism 120). As illustrated, each component has one or more input controllers 224 and one or more sensors 226, but a component may include only sensors or only input controllers. An input controller controls the function of the component. For example, an input controller may receive machine commands via the network and actuate the component in response. A sensor 226 generates measurements within the system environment. The measurements may be of the component, the farming machine, or the environment surrounding the farming machine. For example, a sensor 226 may measure a configuration or state of the component 222 (e.g., a setting, parameter, power load, etc.), or measure an area surrounding a farming machine (e.g., moisture, temperature, etc.).

In some embodiments, components 222 may include one or more spray components to spray, e.g., a measured quantity of a chemical (e.g., herbicide, pesticide, etc.) or biological element on an identified plant or portion of the plant (e.g., chemical treatment action, biological treatment action). As another example, components 222 may include one or more spray components to spray, e.g., a predetermined quantity of hot liquid (e.g., hot oil) on an identified plant or portion of the plant (e.g., hot liquid treatment action). As another example, components may include one or more spray components to spray, e.g., a predetermined quantity of fluid (e.g., hot fluid like steam or flame, pressurized fluid like a pressurized water jet, and the like). As another example, components 222 may include one or more electromagnetic radiation sources to, e.g., emit a measured intensity of laser light, ultraviolet light, x-rays, or other electromagnetic radiation on an identified plant or portion of the plant (e.g., laser treatment action). As another example, components 222 may include one or more mechanical components (e.g., rotary hoe, plough, cutter, etc.) to, e.g., cut, uproot, or dislodge an identified plant or portion of the plant (e.g., mechanical treatment actions). As another example, components 222 may include one or more pneumatic components to, e.g., blast a measured stream of pressurized air to cut an identified plant or portion of the plant (e.g., pneumatic treatment action). As another example, components 222 may include one or more vacuum or suction components to, e.g., generate suction to dislodge or uproot or suction an identified plant or plant portion (e.g., vacuum treatment action).

The control system 230 receives information from the camera array 210 and the component array 220, determines treatment plans (e.g., treatment actions, parameters of the actions), and performs actions based on the treatment plans. For example, the control system 230 controls one or more of the components 222 to perform one or more treatment actions based on a determined treatment plan for an identified plant. Operation and functionality of the control system 230 is described in greater detail below in relation to FIG. 2B.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and the component array 220, processes the information, and transmits the information to the control system 230. The control system 230 generates a treatment plan including a treatment action based on the information and transmits instructions to implement the treatment plant to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

Example Control System

Figure 2B:
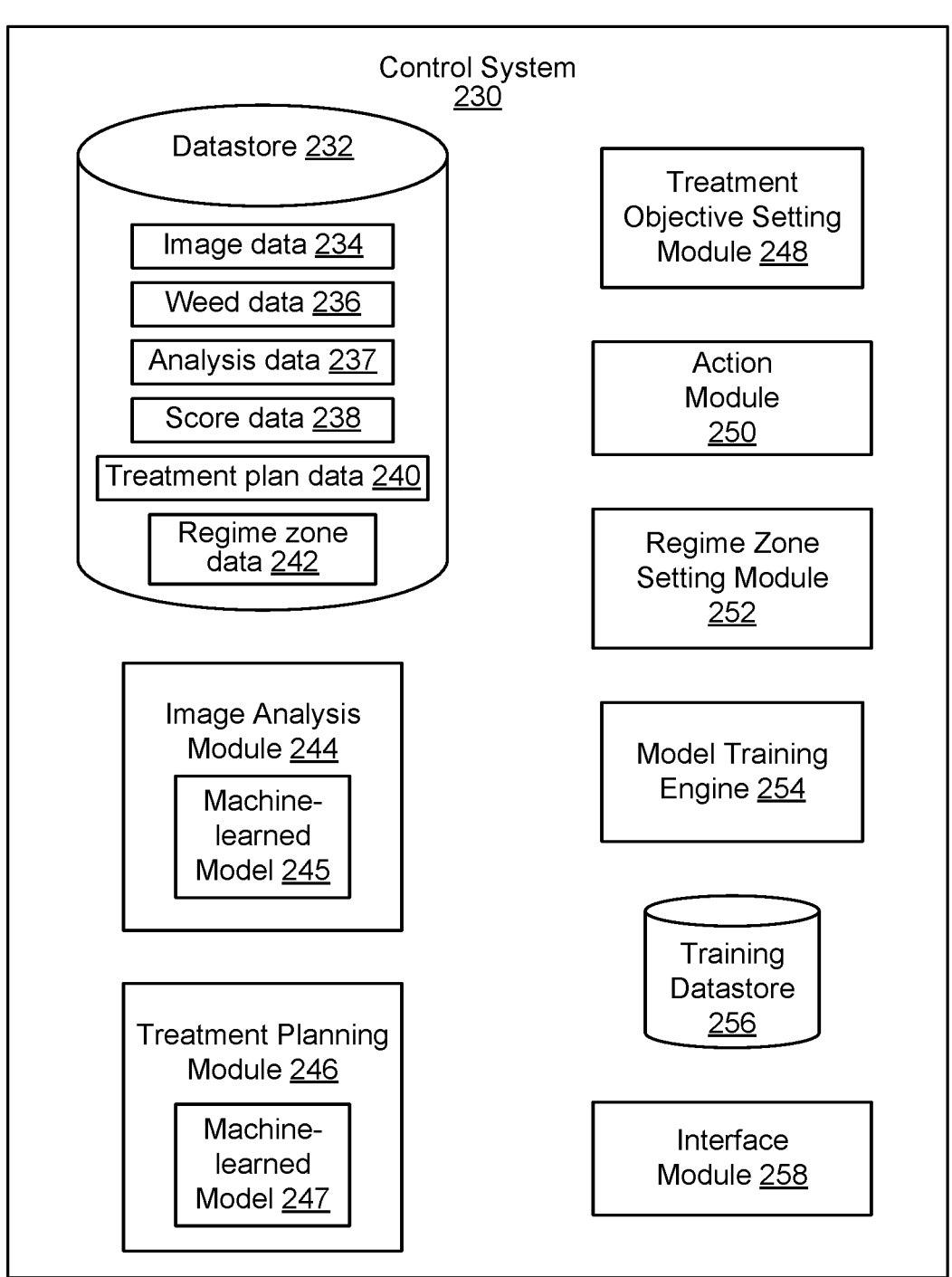
FIG. 2B is a block diagram of a control system of the system environment of FIG. 2A, in accordance with some embodiments.

FIG. 2B is a block diagram of the control system 230 of FIG. 2A, in accordance with some embodiments. Referring to FIG. 2B, the control system 230 includes a datastore 232, an image analysis module 244, a treatment planning module 246, a treatment objective setting module 248, an action module 250, a regime zone setting module 252, a model training engine 254, a training datastore 256, and an interface module 258. The datastore 232 may include different types of data utilized or generated by the control system 230. For example, the datastore 232 may store image data 234, weed data 236, analysis data 237, score data 238, treatment plan data 240, and regime zone data 242. The image analysis module 244 may include one or more machine-learned models 245. The treatment planning module 246 may also include one or more machine-learned models 247. In different embodiments, the control system 230 may include fewer or additional components. The control system 230 may also include different components.

The image data 234 stored in the datastore 232 may be data corresponding to the images captured by the camera array 210 of FIG. 2A or the detection mechanism 110 of FIGS. 1A-1C. In other embodiments, the image data 234 may be captured by cameras mounted to an aerial vehicle (e.g., unmanned aerial vehicle) that is configured to capture images of the geographic area 104. In yet other embodiments, the image data 234 may be satellite image data captured by a satellite. For example, while operating in an autonomous mode, the farming machine 100 of FIG. 1 may navigate a field corresponding to the geographic area 104 while the detection mechanism 110 automatically operates to capture georeferenced images at a determined frequency of portions of the geographic area 104 and store the captured images as the image data 234 in the datastore 232. The datastore 232 may further store metadata in association with the image data 234. For example, the metadata may include a timestamp, location information (e.g., geolocation data, GPS data), local weather information, elevation information, etc. Some or all of the metadata may be captured by sensors included in the detection mechanism 110 (or otherwise disposed on the farming machine).

The image analysis module 244 may access an image of a portion of a geographic area from the image data 234 stored in the datastore 232. The image analysis module 244 may analyze the accessed image data by performing an image analysis operation to identify one or more plants (e.g., weeds) in the image. More specifically, the image analysis operation may identify one or more characteristics of one or more plants in the image. The one or more characteristics may include a type of the weed plant, a growth stage of the weed plant, information regarding different components (e.g., stem, leaves, flowers, seedings, etc.) of the weed plant included in the image, orientation, dimensions, location, etc., of the different identified components, and the like.

To perform the image analysis operation, image analysis module 244 may utilize the weed data 236 stored in the datastore 232. The weed data 236 may include labeled image data of a plurality of different types or species of weeds (e.g., grasses, broadleaf weeds, thistles, dandelions, etc.). For each type of weed, the weed data 236 may further include labeled image data of different parts (e.g., components, portions, etc.) of the weed plant and corresponding attribute data representing, e.g., what the labeled component represents (e.g., stem, root, leaves, flower, seeding, etc.) and what the likely growth stage of the weed plant is as indicated by the labeled component image data. The attribute data may further include treatment action data indicating what the effective one or more treatment actions are for the corresponding labeled weed plant component and/or parameters for the effective treatment actions. For example, the weed data 236 may include labeled weed image data of different portions (e.g., stem, leaf, seeding, flower, etc.) of different types of weed plants, where the labels indicate the type of the weed plant and/or the growth stage of the plant. For example, the different growth stages that may be represented in the weed data 236 may include a germination stage, a leafy growth stage, a budding stage, a flowering & pollination stage, a seed formation stage, a seed dispersal stage, a hardening & dormancy stage, and the like.

Image analysis module 244 may include machine-learned models 245 trained using the labeled weed image data 236. The machined-learned models 245 may include one or more models that are trained to identify characteristics (e.g., attribute data, type of weed plant, components of the weed plant, growth stage of the weed plant, etc.) of a weed plant(s) included in an input image by segmenting the input image into one or more regions corresponding to one or more identified components (e.g., portions or parts) of an identified instance of an individual weed plant. Based on the image segmentation, the machined-learned model 245 may identify at least a growth stage of the weed plant and further identify additional characteristics of the plant. For example, the weed data 236 may be used as training data to train the machine-learned model 245 so that a feature vector generated based on the image data 234 can be input to the trained machine-learned model 245 to determine the likelihood of the image including a particular type of weed (e.g., based on the likelihood of the image including one or more particular components (e.g., portions, parts, characteristics) of the particular type of weed).

Based on the image analysis operation, image analysis module 244 may determine the type (e.g., genus, species, sub-type, etc.) of weed plant included in the image, and further determine one or more parts or components (e.g., stem, leaf, seeding, flower, etc.) of the determined type of plant included in the image. Further, based on the determination and segmentation, the image analysis module 244 may be configured to determine other characteristics of the plant such as the location, orientation, height, width, etc., of the plant, and of the different identified components of the plant. Further, based on the attribute data of the identified components, the image analysis module 244 may also determine the growth stage of the plant corresponding to the identified plant components. Based on the attribute data of the identified components, the image analysis module 244 may also determine the preferred treatment actions (and corresponding treatment parameters) of the plant corresponding to the identified plant components. Data generated based on the image analysis operation by image analysis module 244 may be stored as analysis data 237 in datastore 232.

Treatment planning module 246 may generate a treatment plan for treating the plant(s) detected in the image analyzed by the image analysis module 244. That is, the treatment plan for the plant may be determined by the treatment planning module 246 based on the analysis data 237. For example, the treatment plan may be determined based on data regarding the one or more characteristics (e.g., attribute data, growth stage, type of plant, identified plant parts, location, dimensions, and the like, of the parts) of the plant included in the analysis data 237. Further, the treatment plan may be determined based on a set of treatment objectives set by the treatment objective setting module 248. The set of treatment objectives may include at least one of a plant hindrance objective, a plant reproduction limiting objective, a carbon footprint limiting objective, and a collateral damage limiting objective.

The plant hindrance (e.g., plant mortality) objective relates to treating a plant to kill the plant or hinder its growth to such an extent that it is unlikely to reproduce. The plant reproduction limiting objective relates to treating the plant to limit its ability to reproduce. The carbon footprint limiting objective relates to treating the plant to kill the plant or hinder its growth, while also minimizing the amount of carbon dioxide released into the atmosphere due to the treatment. The collateral damage limiting objective relates to treating the plant to kill the plant or hinder its grown, while also minimizing collateral damage to crop plants, yard and garden plants, beneficial organisms, wildlife, ground water, or surface water that are adjacent to or in the nearby vicinity of the identified weed plant.

The one or more treatment objectives may be selectively settable for the treatment by the treatment objective setting module 248 and may include additional or alternate objectives. For example, other treatment objectives that may be selected by the treatment objective setting module 248 may be based on other environmental impact parameters for weed control and may be defined in terms of parameter-per-production-unit. For example, the parameters may include carbon footprint, organic certification, chemical quantity, and the like, and the production units may include land area (e.g., per acre), mass of production (e.g., per kilogram), volume of production (e.g., per bushel), unit of production (e.g., per bale), and the like.

The treatment objective setting module 248 may enable a user to selectively set one or more objectives for the treatment. With respect to weed treatment, the primary objective may likely be to kill the weed. However, there may be secondary or additional objectives, such as reducing carbon footprint, reducing collateral damage to crop plants, ensuring compliance with organic or other certifications, preventing the weed plant from reproducing after or during treatment, etc. Further, it may be desirable for a user (e.g., agricultural manager) to selectively set the objectives for treatment based on different criteria. For example, a customer may undertake a marketing effort to reduce the carbon footprint associated with manufacture of its food products. As a result, the customer may request suppliers to take steps to reduce the carbon footprint associated with supplied raw materials. On the other hand, other customers may request optimization of metrics like cost and efficiency without regard for the environment in its acquired raw materials. As another example, it may be necessary to adjust the treatment objectives based on local rules or other compliance requirements. Based on customer requirements, it may be desirable to tune the set of treatment objectives on a per-order or a per-customer basis.

Based on the objectives that may be selectively set by a user, the system according to the present disclosure is configured to automatically generate different treatment plans including different treatment actions (and corresponding tuned treatment parameters) for treating the same type of weed plant having the same characteristics. For example, if the set objective is to kill the weed plant without regard to collateral damage or greenhouse gas emissions, the treatment planning module 246 may select as part of the treatment plan, a first treatment action (e.g., use of a mechanical cutter or use of particular type and quantity of chemical herbicide) that may be determined to be the most effective treatment for the identified weed plant. However, in the same situation (i.e., same analysis data 237), if the set objective is to minimize carbon footprint and/or collateral damage to other nearby crop plants and/or optimize some other metric while also killing the weed, the treatment planning module 246 may select as part of the treatment plan, a second treatment action (e.g., use of a laser treatment with measured or determined parameters) despite it being known that the selected treatment action may not be the most effective treatment for killing the identified weed plant.

In some embodiments, to determine the treatment plan based on the set treatment objectives and based on the identified characteristics of the plant, the treatment planning module 246 may utilize the score data 238 stored in the datastore 232. Score data may include data regarding treatment scores for different treatment actions and different treatment objectives for different types (or different growth stages of different types) of weed plants. For example, for the plant hindrance objective, the score data 238 may include, for each type of plant, a plurality of treatment scores respectively for a plurality of treatment actions. The treatment scores may also be customized for different parameters of a given treatment action. The treatment scores for the plant hinderance objective for different treatment actions may thus quantify the likelihood that they will kill the weed or hinder it such that it is unlikely to reproduce. For example, a glyphosate resistant plant may have a low mortality score for a chemical (glyphosate) treatment action, but a high score for mechanical treatment action or laser treatment action.

In some embodiments, for the plant reproduction limiting objective, the score data 238 may include, for each type of plant, a plurality of treatment scores respectively for a plurality of treatment actions. The treatment scores for the plant reproduction limiting objective for different treatment actions may thus be based on the likelihood of not necessarily killing the weed, but on limiting its ability to reproduce. For example, a chemical or mechanical treatment action may have a low score for a weed whose growth stage indicates it is actively reproducing (e.g., a dandelion with mature seeds). This is because mechanical treatment in such a situation may only serve to release and sow the weed seeds. On the other hand, a laser or hot liquid treatment action may have higher scores since they can deactivate seeds and prevent reproduction.

In some embodiments, for the carbon footprint limiting objective, the score data 238 may include, for each type of plant, a plurality of treatment scores respectively for a plurality of treatment actions. The treatment scores for the carbon footprint limiting objective for different treatment actions may thus be based on the likelihood of not necessarily killing the weed, but doing so while also limiting the resulting carbon footprint. For a given treatment action, the carbon footprint score may be based on in-field greenhouse gas emissions as well as greenhouse gases emitted in the manufacturing and transport of, e.g., a chemical used in the treatment. Further, to measure the carbon footprint scores, metrics such as energy used to power a rotary hoe (mechanical treatment action), may be known, and taken into consideration. This information may be used in addition to the farming machine carbon footprint data such as fuel consumption, engine efficiency, generator or pump efficiency, and motor efficiency, and the like, to calculate the overall carbon footprint. And the carbon footprint scores for each treatment action may be based on the overall determined carbon footprint. Further, the scores may account for variables like application rate, application duration, application intensity, etc.

In some embodiments, for the collateral damage limiting objective, the score data 238 may include, for each type of plant, a plurality of treatment scores respectively for a plurality of treatment actions. The treatment scores for the collateral damage limiting objective for different treatment actions may thus be based on the likelihood of not necessarily killing the weed, but on limiting the resulting collateral damage (e.g., spray drift or mechanical damage). Collateral damage score may also account for other factors like biosystem impact, field total application contribution, impact on beneficial organisms such as microbes and fungi, impact on macro fauna such as birds, impact on water quality, and the like.

FIG. 3 illustrates exemplary treatment score data 300, in accordance with some embodiments. In the example of FIG. 3, the treatment score data 300 includes respective treatment scores 305 for treatment actions 310A-E and treatment objectives 320A-320D for treating a dandelion weed plant. As may be evident from treatment score data 300, there are different treatment scores for different combinations of treatment actions 310A-E and treatment objectives 320A-320D. In the example of FIG. 3, score data 300 includes treatment scores 305 for five different treatment actions (rotary hoe mechanical treatment action 310A, glyphosate chemical treatment action 310B, 2,4-D chemical treatment action 310C, laser treatment action 310D, and hot oil treatment action 310E) and four different treatment objectives (plant hinderance objective 320A, plant reproduction limiting objective 320B, carbon footprint limiting objective 320C, and collateral damage limiting objective 320D). However, this is not intended to be limiting. In other examples, the score data 300 may include treatment scores 305 for different combinations of alternate, addition, or fewer treatment actions 310 and alternate, additional, or fewer treatment objectives 320.

Further, in some embodiments, the different sets of treatment scores may be stored in the datastore 232 not only based on the type of weed but also based on the growth stage of the weed. Thus, for example, based on the weed species or type and the weed growth stage as determined by the image analysis module 244, treatment planning module 246 may query the score data 238 in the datastore 232 to obtain corresponding set of treatment scores for combinations of different treatment actions 310 and different treatment objectives 320. Further, in the example of FIG. 3, the scores are shown as relative values (e.g., low, medium, high). In other embodiments, the scores may be numbers, percentages, or any other suitable score or metric that allows a comparison and determination of a ranking of treatment actions for a given type and/or growth stage of plant and for a given treatment objective. In some embodiments, for different combinations of treatment objectives, the treatment scores may be combined for each treatment action into a single metric and an action may be selected based on the metric (e.g., highest, lowest, etc.). In some embodiments, the score data 238 may also convey what parameters for a given treatment action have a higher efficacy for achieving a corresponding objective.

Returning to FIG. 2B, based on the score data 238 and based on the set of treatment objectives set by the treatment objective setting module 248, the treatment planning module 246 may identify one or more treatment actions for treating the plant identified by the image analysis module 244. For example, based on the set treatment objective(s), the treatment planning module 246 may select a treatment action that has the highest treatment score as part of the treatment plan for treating the identified plant. As another example, based on the set treatment objective(s), the treatment planning module 246 may select a treatment action that has the highest treatment score for each set treatment objective, and create the treatment plan to include multiple treatment actions for treating the plant. For example, based on the score data 238, the treatment planning module 246 may determine a treatment plan that includes two treatment actions for treating a single individual identified weed plant, a first treatment action to address a first set treatment objective and a second treatment action to address a second set treatment objective. The treatment planning module 246 may also utilize the score data 238 to determine additional parameters (e.g., intensity, duration, quantity, etc.) for the selected treatment action(s).

In addition, or in the alternate, the treatment planning module 246 may utilize a rule base in conjunction with the attribute data included in the weed data 236 to determine the treatment action(s) and the parameters for the treatment action(s) for each identified weed plant. For example, the rule base may include "if-then" rules that specify criteria based on which a given treatment action (and a given set of parameters for the given treatment action) is selected. The rules may take as input, the characteristics of the identified plant (e.g., growth stage data, plant type or species data, attribute data) to determine the treatment action to be used for treating the identified plant. Further, the rules may take as input the treatment objective(s) for the treatment of the identified plant and determine the treatment action based on the treatment objective(s). Thus, for example, the rule base may determine a first treatment action as the most effective treatment action for a particular plant at a particular growth stage when the objective is to kill the plant and prevent reproduction. However, the rule base may include logic to determine a different treatment action as the most effective treatment action for same plant at the same growth stage when the objective is not only to kill the plant and prevent reproduction, but also to prevent collateral damage.

In some embodiments, the treatment planning module 246 may include machine-learned model(s) 247 that is trained to determine the treatment action(s) to be used based on input characteristics of an identified weed plant and input set of treatment objectives. The machine-learned model(s) 247 may be trained using labeled image data of different components or parts of different types of weed plants and associated treatment action data indicating for each of different treatment objectives, one or more preferred types of treatment actions (and treatment action parameters) for treating the plant per the treatment objective (e.g., historical treatment plan data).

The treatment planning module 246 may store the identified one or more treatment actions (and corresponding treatment parameters) of the treatment plan determined by the treatment planning module 246 as the treatment plan data 240 in the datastore 232. For example, based on the determined treatment plan, the treatment planning module 246 may generate a georeferenced weed record and store the record as the treatment plan data 240 in the datastore 232. The georeferenced weed record may include information necessary to control one or more components of an autonomous farming machine to autonomously navigate to and locate a particular instance of a weed plant in the field and perform treatment actions (with determined treatment parameters) on the particular instance of the weed plant as dictated by the corresponding georeferenced weed record. Thus, the task of treating different growth stages of different weeds with different treatment objectives and using different treatment mechanisms can be distributed across different specialized farming machines of a fleet that are optimized for different types of treatment actions (e.g., using separate farming machines including a rotary hoe farming machine, a chemical spray farming machine, a hot oil spray or laser farming machine, etc.). The treatment planning module 246 may also transmit the georeferenced weed record to an external device (e.g., farming machine) via a network.

Action module 250 may perform actions based on the treatment plan generated by the treatment planning module 246 and stored as the treatment plan data 240. The action module 250 may also be configured to control components of the farming machine to perform the treatment action(s) on the plant based on the treatment plan (georeferenced weed record). For example, the action module 250 may interact with the respective input controllers 224 and the sensors 226 of the components 222 of the component array 220 to actuate respective one or more treatment mechanisms to execute the treatment action(s) with treatment parameters as dictated by the treatment plan.

Regime zone setting module 252 may divide the geographic area where the farming machine operates to set two or more regime zones and define treatment actions (and/or treatment action parameters) that are permissible or allowable in each set regime zone. In some embodiments, the available pool of treatment actions (or corresponding parameters) may be constrained, or the treatment scores may have different (higher or lower) values in different zones or regions of the geographic area, worksite, or agricultural field. For example, a field may have one regime zone near a waterway which excludes use of a first set of treatments (e.g., certain chemicals, use of greater than a threshold quantity of chemicals), a second regime zone near a residential area which excludes use of a second set of treatments, and a third zone covering the rest of the field where the available set of treatments is not so limited.

As another example, a regime zone may be defined based on legal or other compliance requirements, recommendations, or preferences. As yet another example, parameters for a particular treatment action (e.g., herbicide spray) may be constrained in a particular regime zone based on herbicide tolerance of nearby crops, wind direction, wind speed, etc. As yet another example, a regime zone may have higher treatment scores for one type of treatment action over another or one treatment objective over another based on a time of year. For example, during bird nesting season, collateral damage scores may be higher in the regime zone, thereby causing selection of treatment actions and generation of treatment plans if the collateral damage limiting objective is set by the treatment objective setting module 248.

Data corresponding to the regime zones (and corresponding permissible treatments and/or parameters) set by the regime zone setting module 252 may be stored as regime zone data 242 in the datastore 232. During generation of the treatment plan, the treatment planning module 246 may utilize the regime zone data 242 to determine the current regime zone corresponding to the location of the image corresponding to the analysis data 237, and based on the identified regime zone, determine the list of available treatment actions for the regime zone. The treatment planning module 246 may then exclude the treatment actions (or treatment action parameters) that are not available in the current regime zone when determining the one or more treatment actions (and optionally, treatment parameters) for the treatment plan for treating the identified plant based on the analysis data 237. That is, based on a subset of a plurality of treatment actions associated with the current regime zone, the treatment planning module 246 controls to select one or more treatment actions as part of the treatment plan for the identified plant such that the one or more treatment actions (or parameters) are included in the subset of treatment actions associated with the regime zone (and corresponding parameter subsets). In some examples, regime zones define constraints on treatments within a zone. In other examples, regime zones may be used to prioritize or weight potential treatment options within a zone.

Model training engine 254 trains machine-learned models (e.g., models 245, 247) of the control system 230. Model training engine 254 accesses data for training the models in training datastore 256. Training data can include the weed data 236 that includes labeled image data of a plurality of different types of weeds, labeled image data of different parts (e.g., components, attributes, etc.) of the different types of weed, corresponding attribute data representing, e.g., what the labeled component represents (e.g., stem, root, leaves, flower, seeding, etc.) and what the likely growth stage of the weed plant is as indicated by the labeled component image data. The training data may further include historical treatment plan data indicating the treatment actions performed for different types of weed plants and different growth stages of the different types of weed plants. The historical treatment plan data may further include treatment objective data indicating the treatment actions performed for different weeds at different growth stages and for different treatment objectives. The historical treatment plan data may also include before and after image data of the portion of the geographic area corresponding to the treated weed plant.

The model training engine 254 may submit data for storage in training datastore 256. Model training engine 254 may receive labeled training data from a user or automatically label training data (e.g., using computer vision etc.). The model training engine 254 uses the labeled training data to train one or more machine-learned models. In some embodiments, model training engine 254 uses training data labeled with indications of what the different types of weeds to be detected are, what the different growth stages (e.g., indicating whether the weed is actively reproducing by spreading seeds) of the weed are, what the most effective treatment (or set of treatments, or ranking, corresponding treatment parameters) for the different types of weeds, for different growth stages, for different treatment objectives, for different regime zones, are.

In some embodiments, the model training engine 254 uses user feedback to re-train machine-learned models. The model training engine 254 may curate what training data to use to re-train a machine-learned model based on a measure of satisfaction provided in the user feedback. For example, the model training engine 254 receives user feedback indicating that a user is highly satisfied with identified weed plants in an image, identified plant parts or components, identified growth stages, or identified treatment actions for the plants or plant parts. The model training engine 254 may then strengthen an association between, e.g, treatment actions or parameters of treatment actions and weed characteristics and/or treatment objectives by creating new training data using the image data, the analysis data, and respective machine-learned model outputs associated with the high satisfaction to re-train one or more of the machine-learned models. In some embodiments, the model training engine 254 attributes weights to training data sets or feature vectors. The model training engine 254 may modify the weights based on received user feedback and re-train the machine-learned models with the modified weights. By training a machine-learned model in a first stage using training data before receiving feedback and a second stage using training data as curated according to feedback, the model training engine 254 may train machine-learned models of the control system 230 in multiple stages.

Interface module 258 is an interface for a user and/or a third-party software platform to interact with the control system 230. The interface module 258 may be a web application that is run by a web browser on a user device or a software as a service platform that is accessible by a user device through the network 250. In one embodiment, the interface module 258 may use application program interfaces (APIs) to communicate with user devices or third-party platform servers, which may include mechanisms such as webhooks.

Treatment Plan Generation Example

Figure 4:
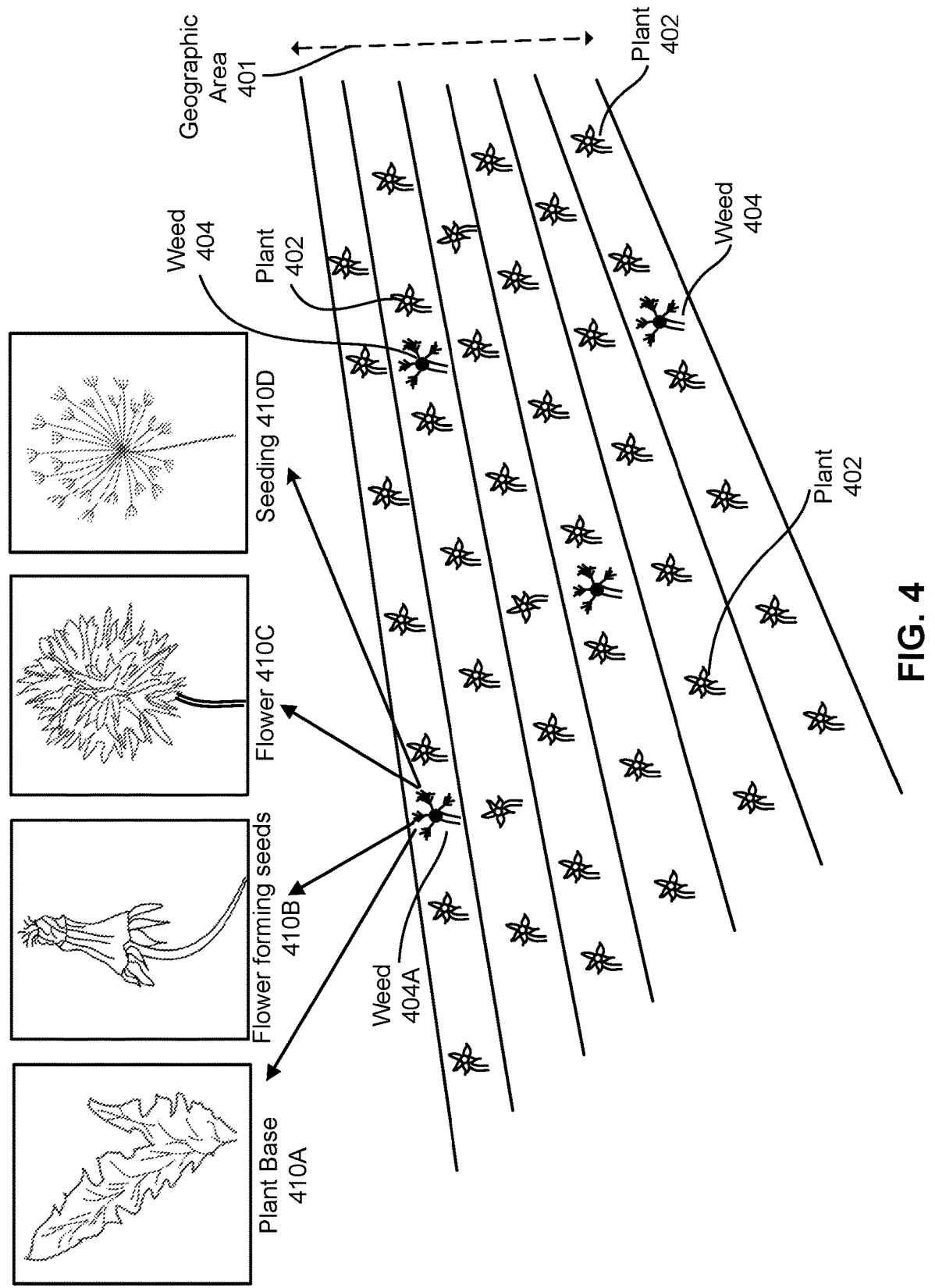
FIG. 4 depicts an example of determining a treatment plan for a plant based on identified characteristics of the plant, in accordance with some embodiments.

FIG. 4 depicts an example environment 400 where a treatment plan is determined for a plant based on identified characteristics of the plant, in accordance with some embodiments. The example environment 400 depicted in FIG. 4 shows a geographic area 401 corresponding to an agricultural field where plants 402 are being grown in one or more plant rows (e.g., plant beds) that are parallel to each other. Although not shown in FIG. 4, a farming machine (e.g., farming machine 100 of FIGS. 1A-1C) may navigate the geographic area 401 to perform a variety of operations (e.g., weed treatment) in the field. In addition to the plants, weeds 404 may grow in the geographic area 401 and compete with the crop plants 402 for nutrients and water from the substrate of the geographic area 401. It may be desirable to kill the weeds to promote growth of the crop plants 402. Weeds 404 may be of different types. Example environment 400 illustrates a case where an image of a portion of the geographic area 401 corresponding to a dandelion weed plant 404A is captured by an image sensor (e.g., camera 212 of FIG. 2A, detection mechanism 110 of FIGS. 1A-1C) of a farming machine (e.g., 100 in FIG. 1C) and analyzed by the image analysis module 244 of FIG. 2B.

Based on the image analysis, the image analysis module 244 may generate analysis data 237 that identifies one or more characteristics of the weed plant 404A detected in the image. For example, the image analysis module 244 may perform the image analysis operation as previously described to segment the image into regions that respectively identify components of the weed 404A. The segmentation may result in bounding boxes around the identified components in the image, as shown by callout regions 410A, 410B, 410C, and 410D (collectively, 410). Regions 410 of the image correspond to different identified portions or components of the weed plant 404A. In the example shown in FIG. 4, callout 410A corresponds to the plant base or stem of the dandelion weed plant 404A, callout 410B corresponds to a flower forming seeds of the dandelion weed plant 404A, callout 410C corresponds to a flower of the dandelion weed plant 404A, and callout 410D corresponds to a mature seeding of the dandelion weed plant 404A. In other examples, other types of components may be detected, or more than one instance of a given component may be detected in the analyzed image. Also, no weed plant or more than one individual weed plant may be detected in the analyzed image and processing and operations may be performed for each identified weed plant as described herein. Based on the analysis and segmentation, the image analysis module 244 may identify one or more characteristics of the weed plant 404A such as a type of the weed plant (dandelion in case of FIG. 4), a growth stage of the weed plant (seed dispersal stage based on detection of seeding 410D), information regarding different components (components 410A-410D) of the weed plant included in the image, orientation, dimensions, location, etc., of the different identified components, attribute data respectively corresponding to callouts 410A-410D, and the like. And the image analysis module 244 may store the data of the one or more identified characteristics as the analysis data 237.

Further, based on the identified characteristics, and based on the set treatment objective(s), the treatment planning module 246 may determine the treatment plan for the identified and analyzed plant 404A. In determining the treatment plan, the treatment planning module 246 may access treatment score data 238 (e.g., access data of table 300 shown in FIG. 3) indicating the treatment scores for different treatment actions for the detected plant 404A (i.e., treatment scores for dandelion plant) and further for the set one or more treatment objectives.

With the image segmented and treatment scores available, the treatment planning module 246 may determine the treatment actions to be included in the treatment plan for treatment of the identified plant 404A. In the example of FIG. 4, the plant 404A is identified as a dandelion plant. Further, assume the set treatment objectives are to kill the plant 404A and also limit its reproduction (e.g., objectives 320A and 320B in FIG. 3). In this case, since the weed 404A is determined to be in a growth stage of reproduction (based on seeding 410D component of the weed 404A and corresponding metadata), based on the example scores of FIG. 3, the treatment planning module 246 may determine a hot oil treatment action for the dandelion plant 404A to kill the seeds and stop them from spreading and reproducing by spraying a determined amount of hot oil on the mature and forming seeds (e.g., spray with hot oil, portion of plant 404A corresponding to components 410B and 410D; FIG. 3—objective 320B and action 310E). Further, to kill the weed plant 404A itself, the treatment planning module 246 may determine a mechanical treatment action for the dandelion plant 404A where a rotary hoe is operated to severely damage the tap root of the plant down to 4 inches beneath the soil (e.g., cut based on portion of plant 404A corresponding to component 4410A; FIG. 3—objective 320A and action 310A).

Further, the treatment planning module 246 may perform the above action selection based on available or permissible actions for a regime zone corresponding to the portion of the geographic area 401 where the plant 404A is located. Thus, for example, if the rotary hoe treatment action 310A is not permissible in the regime zone of the plant 404A, the treatment planning module 246 may determine, e.g., the 2,4-D chemical treatment action to kill the plant 404A, after the hot oil treatment action for stopping reproduction of the plant 404A. Based on the determined treatment plan, the action module 250 may control corresponding components of the farming machine to carry out the corresponding determined treatment actions (and corresponding determined parameters of the actions).

Example Process for Determining the Treatment Plan for a Plant

FIG. 5 is a flow chart 500 illustrating a process of determining the treatment plan for the plant based on characteristics of the plant and based on treatment objectives, in accordance with some embodiments. It should be noted that the process illustrated herein can include fewer, different, or additional steps in other embodiments. Control system 230 may access 510 an image of a portion of a geographic area. Control system 230 may analyze 520 the image to identify a plant in the portion of the geographic area. Control system 230 may determine 530 a treatment plan for the plant based on one or more characteristics of the plant and further based on a set of treatment objectives. The set of treatment objectives include two or more of a plant hindrance objective, a plant reproduction limiting objective, a carbon footprint limiting objective, and a collateral damage limiting objective. Control system 230 may perform 540 an action based on the treatment plan.

Example Computer System

Figure 6:
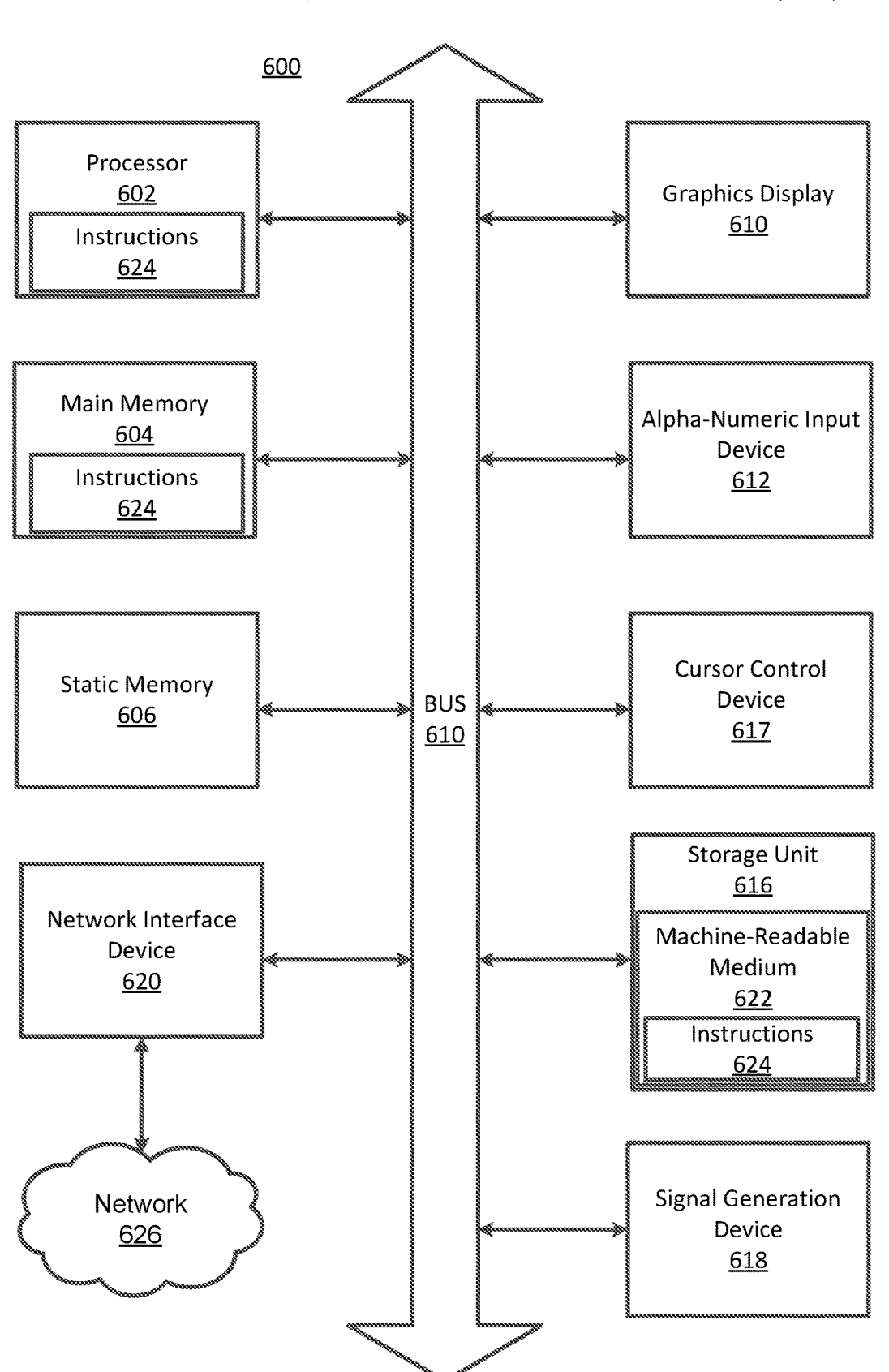
FIG. 6 is a block diagram illustrating components of an example machine for reading and executing instructions from a machine-readable medium, in accordance with one or more example embodiments.

FIG. 6 is a block diagram illustrating components of an example machine for reading and executing instructions from a machine-readable medium, in accordance with one or more example embodiments.

FIG. 6 is a block diagram illustrating components of an example machine for reading and executing instructions from a machine-readable medium, in accordance with one or more example embodiments. Specifically, FIG. 6 shows a diagrammatic representation of the control system 130 described in FIGS. 1A-1C and/or the control system 230 described in FIGS. 2A-2B, in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IOT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include an alphanumeric input device 612 (e.g., a keyboard), a cursor control device 617 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the control system 130 described in FIGS. 1A-1C and/or the control system 230 described in FIGS. 2A-2B. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing, by a farming machine, an image of a portion of a geographic area;
   analyzing, by the farming machine, the image to identify a plant in the portion of the geographic area;
   accessing, by the farming machine, a set of treatment objectives, the set of treatment objectives including two or more of a plant hindrance objective, a plant reproduction limiting objective, a carbon footprint limiting objective, and a collateral damage limiting objective;
   determining, by the farming machine, a regime zone corresponding to the portion of the geographic area;
   accessing, for each of a plurality of treatment actions, treatment score data indicating efficacy of the treatment action in achieving a given treatment objective for a given type of plant;
   accessing regime zone data indicating a subset of one or more of the plurality of treatment actions that are impermissible for the regime zone; and
   determining, by the farming machine, one or more treatment actions of a treatment plan for the plant based on one or more characteristics of the plant, the set of treatment objectives, and the regime zone corresponding to the portion of the geographic area, wherein the one or more treatment actions are selected from among the plurality of treatment actions by excluding the subset of treatment actions and selecting, from a remainder of the plurality of treatment actions, the one or more treatment actions based on the treatment score data.

2. The method of claim 1, wherein analyzing the image comprises segmenting the image into regions corresponding to identified one or more plant components of the plant, and wherein the method further comprises determining the one or more characteristics of the plant based on the identified one or more plant components.

3. The method of claim 2, wherein the one or more treatment actions include at least two treatment actions, and wherein the method further comprises:
   performing a first treatment action for a first one of the one or more plant components of the plant, wherein the first treatment action is performed to address a first one of the set of treatment objectives; and
   performing a second treatment action for a second one of the one or more plant components of the plant, wherein the second treatment action is performed to address a second one of the set of treatment objectives.

4. The method of claim 1, further comprising:
   generating a georeferenced weed record based on the treatment plan;
   transmitting the georeferenced weed record to an external device; or performing the one or more treatment actions on the plant based on the treatment plan.

5. The method of claim 4, wherein the one or more treatment actions includes one or more of a mechanical treatment action, a chemical treatment action, a hot fluid treatment action, a pneumatic treatment action, a vacuum treatment action, a pressurized fluid treatment action, an electromagnetic radiation treatment action, or a biological treatment action.

6. The method of claim 1, wherein the plant is a weed and wherein the one or more characteristics of the plant include a type of the weed and a growth stage of the weed.

7. The method of claim 6, further comprising:
   accessing the treatment score data based on the type of the weed, the treatment score data including treatment scores for combinations of treatment actions and treatment objectives; and
   selecting the one or more treatment actions based on the treatment scores and the set of treatment objectives, wherein the treatment plan is determined based on the selected one or more treatment actions.

8. The method of claim 1, wherein determining the treatment plan comprises inputting the one or more characteristics and the set of treatment objectives into a machine-learned model that is trained based on historical treatment plan data indicating treatment actions performed for plants having different characteristics to output recommended one or more treatment actions.

9. A farming machine comprising:
   a hardware processor; and
   a non-transitory computer-readable storage medium storing executable instructions that, when executed by the hardware processor, cause the hardware processor to perform steps comprising:
      accessing an image of a portion of a geographic area;
      analyzing the image to identify a plant in the portion of the geographic area;
      accessing a set of treatment objectives, the set of treatment objectives including two or more of a plant hindrance objective, a plant reproduction limiting objective, a carbon footprint limiting objective, and a collateral damage limiting objective;
      determining a regime zone corresponding to the portion of the geographic area;
      accessing, for each of a plurality of treatment actions, treatment score data indicating efficacy of the treatment action in achieving a given treatment objective for a given type of plant;
      accessing regime zone data indicating a subset of one or more of the plurality of treatment actions that are impermissible for the regime zone; and
      determining one or more treatment actions of a treatment plan for the plant based on one or more characteristics of the plant, the set of treatment objectives, and the regime zone corresponding to the portion of the geographic area, wherein the one or more treatment actions are selected from among the plurality of treatment actions by excluding the subset of treatment actions and selecting, from a remainder of the plurality of treatment actions, the one or more treatment actions based on the treatment score data.

10. The farming machine of claim 9, wherein the instructions that cause the hardware processor to perform the step comprising analyzing the image comprise instructions that, when executed by the hardware processor, cause the hardware processor to perform a step comprising segmenting the image into regions corresponding to identified one or more plant components of the plant, and wherein the instructions further cause the hardware processor to perform a step comprising determining the one or more characteristics of the plant based on the identified one or more plant components.

11. The farming machine of claim 10, wherein the one or more treatment actions include at least two treatment actions, and wherein the instructions further cause the hardware processor to perform steps comprising:

performing a first treatment action for a first one of the one or more plant components of the plant, wherein the first treatment action is performed to address a first one of the set of treatment objectives; and performing a second treatment action for a second one of the one or more plant components of the plant, wherein the second treatment action is performed to address a second one of the set of treatment objectives.

12. The farming machine of claim 9, wherein the instructions further cause the hardware processor to perform steps comprising one or more of:

generating a georeferenced weed record based on the treatment plan;

transmitting the georeferenced weed record to an external device; or performing the one or more treatment actions on the plant based on the treatment plan.

13. The farming machine of claim 12, wherein the one or more treatment actions includes one or more of a mechanical treatment action, a chemical treatment action, a hot fluid treatment action, a pneumatic treatment action, a vacuum treatment action, a pressurized fluid treatment action, an electromagnetic radiation treatment action, or a biological treatment action.

14. The farming machine of claim 9, wherein the plant is a weed and wherein the one or more characteristics of the plant include a type of the weed and a growth stage of the weed.

15. The farming machine of claim 14, wherein the instructions further cause the hardware processor to perform steps comprising:

accessing the treatment score data based on the type of the weed, the treatment score data including treatment scores for combinations of treatment actions and treatment objectives; and selecting the one or more treatment actions based on the treatment scores and the set of treatment objectives, wherein the treatment plan is determined based on the selected one or more treatment actions.

16. A non-transitory computer-readable storage medium storing executable instructions that, when executed by a hardware processor, cause the hardware processor to perform steps comprising:

accessing an image of a portion of a geographic area;

analyzing the image to identify a plant in the portion of the geographic area;

accessing a set of treatment objectives, the set of treatment objectives including two or more of a plant hindrance objective, a plant reproduction limiting objective, a carbon footprint limiting objective, and a collateral damage limiting objective;

determining a regime zone corresponding to the portion of the geographic area;

accessing, for each of a plurality of treatment actions, treatment score data indicating efficacy of the treatment action in achieving a given treatment objective for a given type of plant;

accessing regime zone data indicating a subset of one or more of the plurality of treatment actions that are impermissible for the regime zone; and determining one or more treatment actions of a treatment plan for the plant based on one or more characteristics of the plant, the set of treatment objectives, and the regime zone corresponding to the portion of the geographic area, wherein the one or more treatment actions are selected from among the plurality of treatment actions by excluding the subset of treatment actions and selecting, from a remainder of the plurality of treatment actions, the one or more treatment actions based on the treatment score data.

* * * * *